United States Patent [19]

Kitamura

[11] 4,375,063

[45] Feb. 22, 1983

[54] RECORDING APPARATUS WITH LASER BEAM

[75] Inventor: Takashi Kitamura, Yokohama, Japan

[73] Assignee: Canon Kabushiki Kaisha, Tokyo, Japan

[21] Appl. No.: 225,344

[22] Filed: Jan. 15, 1981

[51] Int. Cl.³ .................... G01D 15/04; G01D 15/20
[52] U.S. Cl. .................................... 346/108; 346/76 L
[58] Field of Search ............................ 346/108, 76 L; 355/67 S, 71

[56] References Cited

U.S. PATENT DOCUMENTS

| | | | |
|---|---|---|---|
| 706,743 | 8/1902 | Fessenden | 346/108 UX |
| 3,178,997 | 4/1965 | Kelly | 355/71 |
| 3,205,767 | 9/1965 | Weber et al. | 355/71 X |
| 4,059,833 | 11/1977 | Kitamura et al. | 346/108 |
| 4,132,477 | 1/1979 | Watabe et al. | 355/71 X |

FOREIGN PATENT DOCUMENTS 891992  3/1962  United Kingdom ................. 355/71

*Primary Examiner*—Donald A. Griffin
*Attorney, Agent, or Firm*—Fitzpatrick, Cella, Harper & Scinto

[57] ABSTRACT

There is disclosed a recording apparatus capable of providing image recording of satisfactory quality on a photosensitive member, having a wavelength dependent sensitivity, with a laser beam from a semiconductor laser element.

The recording apparatus utilizing a semiconductor laser element has a semiconductor laser element for emitting a laser beam, a deflector for deflecting the laser beam emitted from the semiconductor laser element, a photosensitive member for receiving the laser beam deflected by the deflector, a filter positioned in the optical path of the laser beam between the semiconductor laser element and the photosensitive member, and a filter angle adjustor for adjusting the angle of the filter with respect to the laser beam.

13 Claims, 7 Drawing Figures

RECORDING APPARATUS WITH LASER BEAM

BACKGROUND OF THE INVENTION

1. Field of the Invention

The present invention relates to a recording apparatus utilizing a laser beam, and more particularly to a recording apparatus for recording information on a photosensitive member with a laser beam emitted by a semiconductor laser element.

2. Description of the Prior Art

The use of a semiconductor laser element as a light source is already well known in the fields of optical communication and of recording apparatus as disclosed in the U.S. patent application Ser. No. 822,340 now abandoned in favor of continuation application Ser. No. 87,705, filed Oct. 24, 1979 of the present applicant. In such applications there is commonly employed an automatic power control method (hereinafter called APC) for maintaining a constant optical output of the semiconductor laser.

FIG. 1 shows the process of such automatic power control in which the optical output from a semiconductor laser element 1 is detected by a photodetector 2 and, after amplification by an amplifier 3, is supplied as a feedback signal to a laser drive circuit 4 in such a manner as to maintain constant the output of said photodetector 2. Such control is widely employed to compensate for the change in the output of the semiconductor laser element resulting from the change in the circumferential conditions or from the deterioration of said element.

However, in the application of a semiconductor laser element in a recording apparatus utilizing the electrostatic recording process, the output of photo-sensitive member made, for example, of cadmium selenide or selenium, is dependent on the wavelength. In the case of a short-wavelength laser such as an ordinary He-Ne laser, the conventional APC is applicable since such photosensitive members have a relatively flat spectral sensitivity in the range of the laser wavelength.

In the near-infrared region (approximately 8000 Å) of the semiconductor laser element, the ordinary photosensitive members for electrostatic recording have a relatively low sensitivity and are therefore often sensitized in case a semiconductor laser element is to be utilized in such image recording apparatus. However, in consideration of the stability of image quality and of the photosensitive member, the sensitivity after said sensitization cannot be made flat in the wavelength region of the semiconductor laser and shows an inevitable dependence on the wavelength as shown by curve a in FIG. 2, thus becoming lower at a longer wavelength.

For this reason it becomes necessary to control the optical output in relation to the wavelength of the semiconductor laser element to be employed, and the conventional APC method is unable to ensure a satisfactory image quality in case of wavelength fluctuation during the function of the semiconductor laser element.

As an example, the output wavelength of an ordinary semiconductor laser element shows a fluctuation of 2.5 to 3.0 Å per degree so that it shows a maximum change of 90 Å for a temperature change of 30° C. Consequently the obtainable image quality becomes more deteriorated as the wavelength dependence of the sensitivity is higher.

SUMMARY OF THE INVENTION

The object of the present invention is to provide a recording apparatus allowing image recording of satisfactory quality on a photosensitive member having a wavelength dependent sensitivity with a laser beam from a semiconductor laser element.

Another object of the present invention is to provide a recording apparatus allowing recording of satisfactory quality with a laser beam from a semiconductor laser element utilizing an automatic power control.

Still another object of the present invention is to provide a recording apparatus capable of recording with a stable and satisfactory quality by means of an extremely simple structure.

DESCRIPTION OF THE PREFERRED EMBODIMENTS

Now the present invention will be explained in detail by the embodiments thereof shown in the attached drawings.

Figure 3:
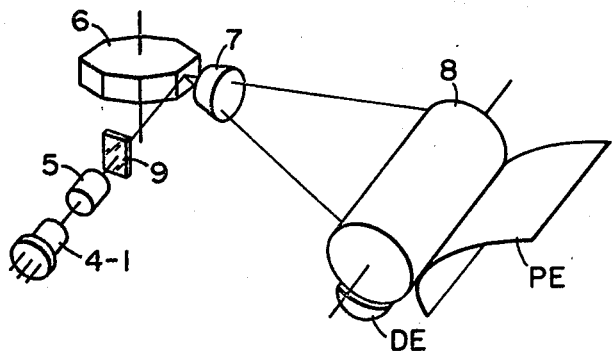
FIG. 3 is a perspective view of the recording apparatus.

FIG. 3 shows an embodiment of the present invention in which a beam emerging from a semiconductor laser unit 4-1 provided with a semiconductor laser element is collimated by a collimating lens 5, and then, after passing through a filter 9, is diverted by a rotary polygonal mirror 6 and is focused by an imaging lens 7 to achieve scanning motion on a photosensitive drum 8. An imagewise pattern is formed on said drum 8 by current modulation of the semiconductor laser element according to the original image pattern signal.

Said photosensitive drum 8 constitutes a part of an electrophotographic apparatus and is composed of a photosensitive member as disclosed in the U.S. Pat. No. 4,059,833. Said drum is uniformly charged by an unrepresented charger and is scanned by a laser beam to form a latent image corresponding to the trajectory of said laser beam. Said latent image is rendered visible by toner deposition in a developing unit DE. The visible image obtained is transferred onto a transfer sheet PE and is fixed in an unrepresented fixing unit to obtain a transfer sheet having the desired image pattern.

The formation of such an image pattern and the on-off control of the semiconductor laser element are already known in the art as disclosed for example in the aforementioned United States Patent No. 4,059,833.

Figure 1:
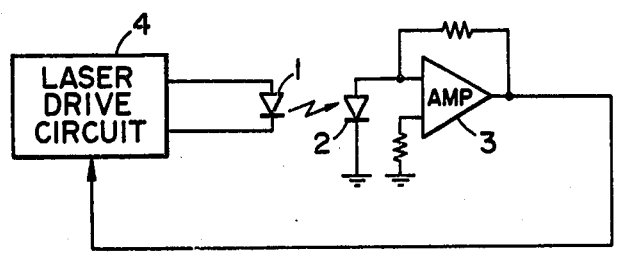
FIG. 1 is a schematic diagram of a power control circuit for a semiconductor laser element.
Figure 2:
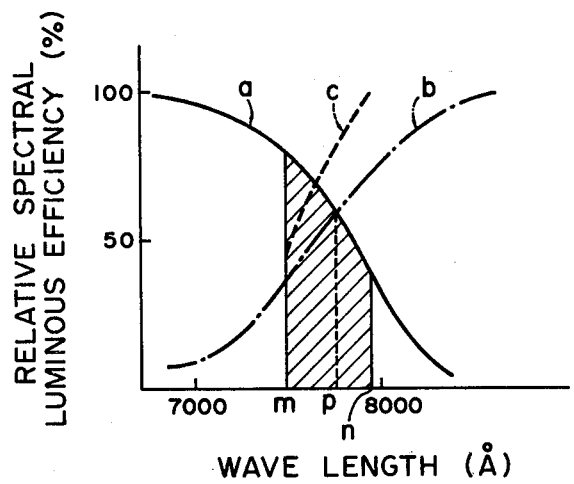
FIG. 2 is a chart showing the wavelength dependence of sensitivity of the photosensitive member.

The aforementioned filter 9 is provided with a spectral transmission $T(\lambda)$ as shown by curve b in FIG. 2 and generally given by an equation:

$$T(\lambda) = \text{const.} \times 1/A(\lambda)$$

wherein $A(\lambda)$ is the spectral sensitivity distribution of the photosensitive member. However the spectral transmission need not exactly satisfy the above-mentioned relation but may be such as not to cause any substantial change in the image pattern formed on the transfer sheet PE despite a change in the wavelength of the laser beam.

In this manner, in case the wavelength of the semiconductor laser varies from p to n (Å) due to deterioration of the laser element or a change in the circumferential conditions causing a loss in the sensitivity of the photosensitive member as shown by the curve a in FIG. 2, the filter 9 provides a correspondingly increased transmission as shown by the curve b in FIG. 2, thus giving a substantially compensated image pattern on the photosensitive member.

On the other hand, in case the wavelength of the semiconductor laser is changed from p to m (Å) causing an increase in the sensitivity of the photosensitive member as shown by the curve a in FIG. 2, the filter 9 provides a correspondingly decreased transmission as shown by the curve b in FIG. 2, thus again giving a substantially compensated image pattern on the photosensitive member.

In this manner the image density obtained remains constant even when the wavelength of the semiconductor laser is changed due to deterioration of the laser element or to a change in the circumferential conditions. In case the range of wavelength actually encountered is limited, for example from m to n in FIG. 2, the system transmission can be so designed as to be equal to 100% at the wavelength n. In such case the spectral transmission of the filter can be normalized at 100% at the wavelength m. In this manner compensation is easily achievable without excessive load to the laser, as shown by the curve c in FIG. 2.

Such filter may be comprised of an optically absorbing filter. However, in case the desired spectral transmission is not available in commercially available filters, it is possible to arbitrarily design the spectral transmission with a multi-layered filter, for example by depositing $MgF_3$ and $ZrO_2$ in alternate layers of an optical thickness of 235.8 nm on a BK7 glass.

Figure 4A:
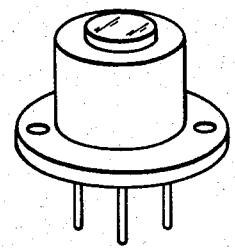
FIGS. 4A and 4B are respectively a cross-sectional view and a perspective view of another embodiment of the light source.
Figure 4B:
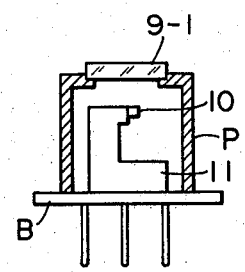

FIGS. 4A and 4B show another embodiment in which the filter 9-1 functions also as the window glass of the package P of the semiconductor laser unit 4-1. 10 is the semiconductor laser element while 11 is a mount therefor, and FIGS. 4A and 4B respectively show the external view and cross-sectional view. In this manner the light source can be compact and made inexpensively.

The filter 9 or 9-1 has to be replaced properly in case of an eventual fluctuation of the characteristic of the photosensitive member used or in case a more precise compensation is desired, but a compensation without such filter replacement is further achievable by providing the filter with an angle regulating mechanism.

Figure 5:
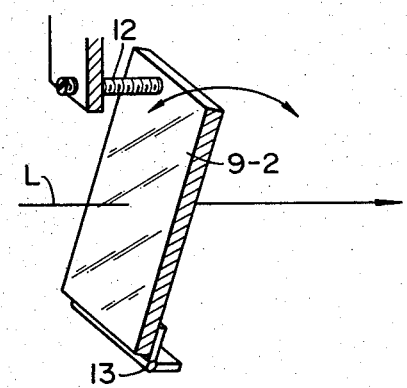
FIG. 5 is perspective view of a filter.

FIG. 5 shows an embodiment therefor in which the filter 9 shown in FIG. 3 is replaced by a filter 9-2 which is supported on a pivotable support 13 such as hinge and is rendered angularly adjustable with respect to the laser beam by means of an adjusting screw 12. Generally the spectral transmission of an optical or dielectric filter is slightly shifted according to the incident angle of the light beam due to a resulting change in the optical path in the filter. It is therefore rendered possible to achieve precise light control with a single filter if the filter angle is adjusted according to the fluctuation in the characteristic of the photosensitive member.

Figure 6:
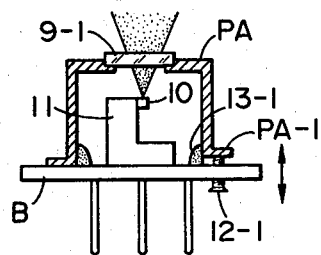
FIG. 6 is a cross-sectional view showing still another embodiment of the light source.

FIG. 6 shows an embodiment in which the filter angle adjusting mechanism is provided in the semiconductor laser unit. In the illustrated example the package PA having the filter 9-1 is rendered angularly adjustable with respect to a base B on which said mount 11 is fixed. More specifically a sealing member 13-1 composed of an elastic material such as rubber is so fixed on the base B as to be in close contact with the internal face of the package PA. Also a screw 12-1 is fitted into the base B so as to engage a flange PA-1 of said package PA. In this manner the filter 9-1 is rendered angularly adjustable while maintaining the sealed state of the package PA by rotating said screw 12-1.

What I claim is:

1. A recording apparatus utilizing a semiconductor laser element comprising:
    a semiconductor laser element for emitting a laser beam;
    deflecting means for deflecting the laser beam emitted from said semiconductor laser element;
    a photosensitive member for receiving the laser beam deflected by said deflecting means;
    a filter positioned in the optical path of said laser beam between said semiconductor laser element and said photosensitive member; and
    filter angle adjusting means for adjusting the angle of said filter with respect to said laser beam.

2. A recording apparatus according to the claim 1, wherein said filter is positioned between said semiconductor laser element and said deflecting means.

3. A recording apparatus according to the claim 2, wherein said filter angle adjusting means comprises a hinge pivotably supporting said filter and an angle adjusting screw.

4. A recording apparatus according to the claim 1, further comprising a container containing said semiconductor laser element and wherein said filter is mounted on a window of said container.

5. A recording apparatus according to the claim 4, wherein said container comprises a base and a package and said angle adjusting means is adapted to adjust the angle of said package with respect to said base.

6. An apparatus for recording by use of a laser, comprising:
    semiconductor laser element means for generating a laser beam the wavelength of which varies in accordance with variation of temperature to which said laser element means is exposed;
    photosensitive means positioned to be exposed to and sensitive to the laser beam generated by said semiconductor laser element means, said photosensitive means having a wavelength dependency such that the photosensitivity characteristics thereof vary in accordance with the variation of the wavelength of the laser beam within a range of wavelength variation; and
    filter means disposed in the path of the laser beam between said semiconductor laser element means and said photosensitive means, said filter means having laser beam transmission characteristics substantially opposite to the wavelength dependency of said photosensitive means.

7. An apparatus for recording by use of a laser according to the claim 6, wherein said photosensitive means comprises cadmium selenide.

8. An apparatus for recording by use of a laser according to the claim 6, wherein said photosensitive means comprises a photosensitive element adapted to form an electrostatic latent image by uniform electrostatic charging followed by laser beam irradiation.

9. An apparatus for recording by use of a laser comprising:
   semiconductor laser element means for generating a laser beam the wavelength of which varies in accordance with variation of temperature to which said laser element means is exposed;
   photosensitive means positioned to be exposed to the laser beam generated by said semiconductor laser element means and characterized in that its photosensitivity is reduced as the wavelength of the laser beam increases within a range of wavelength variation; and
   optical filter means disposed in the path of the laser beam between said semiconductor laser element means and said photosensitive means and having such characteristics that the quantity of laser beam transmitted therethrough increases as the wavelength of the laser beam increases within the range of wavelength variation.

10. An apparatus for recording by use of a laser according to the claim 9, wherein said photosensitive means comprises cadmium selenide.

11. An apparatus for recording by use of a laser according to the claim 9 further comprising:
   laser beam receiving means for receiving the laser beam emitted by said semiconductor laser element means; and
   drive means for so controlling said semiconductor laser element means so as to maintain a constant laser beam to be received by said laser beam receiving means.

12. An apparatus for recording by use of a laser comprising:
   semiconductor laser element means for generating a laser beam the wavelength of which varies in accordance with variation of temperature to which said laser element means is exposed;
   photosensitive means positioned to be exposed to the laser beam generated by said semiconductor laser element means and having sensitivity characteristics equal to A ($\lambda$) for the wavelength of the laser beam within a range of wavelength variation; and
   filter means disposed in the path of the laser beam between said semiconductor laser element means and said photosensitive means and having a transmission factor equal to (constant/A($\lambda$)) for the wavelength of the laser beam.

13. An apparatus for recording by use of a laser comprising:
   means for generating a laser beam the wavelength of which varies;
   casing means for encasing said laser beam generating means, and having an opening through which the laser beam projects;
   photosensitive means positioned to be exposed to the laser beam generated by said laser beam generating means encased in said casing means, said photosensitive means having photosensitive characteristics dependent on the wavelength of a laser beam incident thereon; and
   filter means disposed adjacent the opening in said casing means, said filter means having laser beam transmission characteristics such that the variation of the wavelength of the laser beam to which said photosensitive means is exposed causes the sensitivity of said photosensitive means to be reduced.

* * * * *